R. W. GARDNER.
Governors for Steam-Engines.
No 142,846.          Patented September 16, 1873.
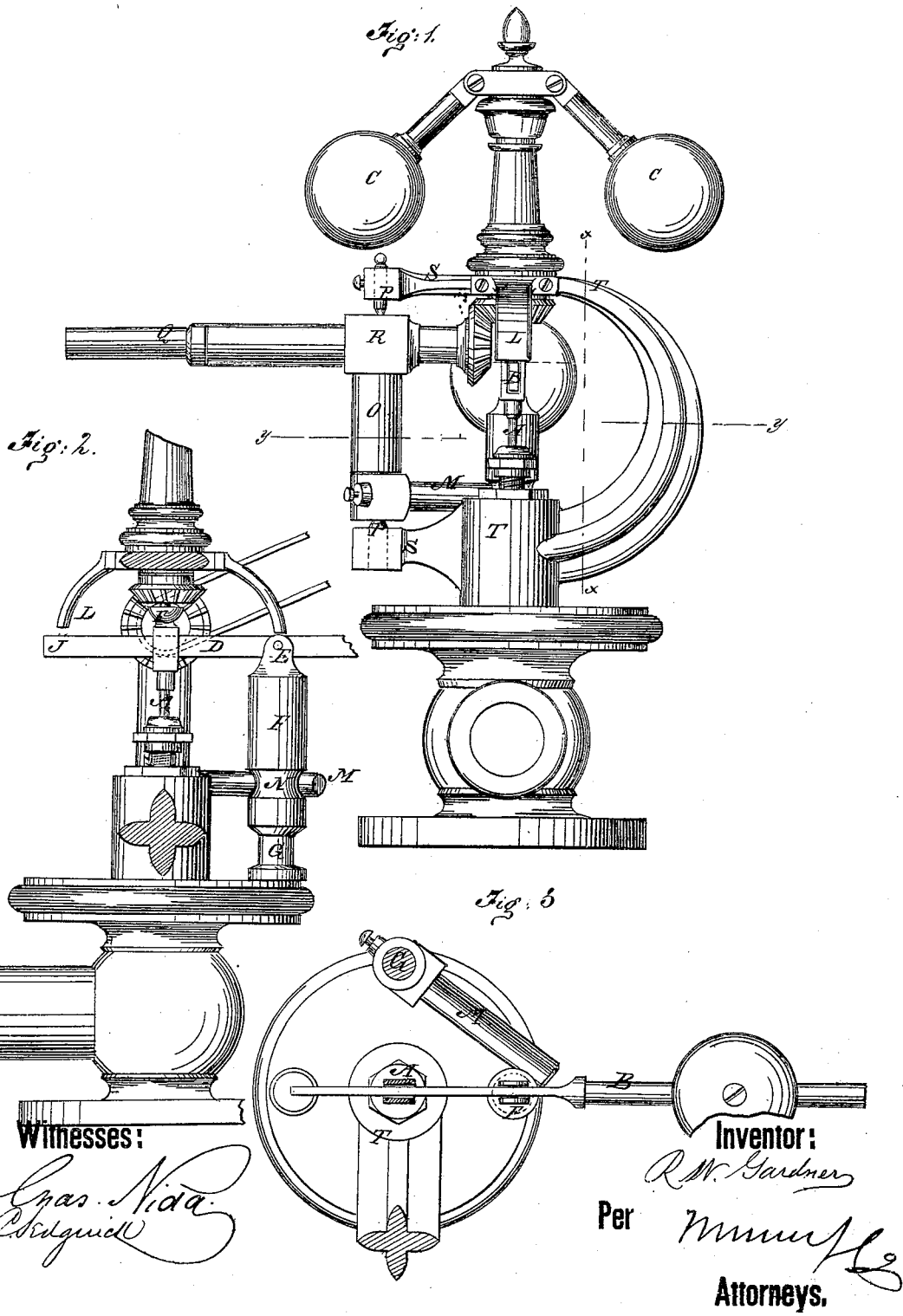
Witnesses:
Inventor:
R. W. Gardner
Per    Attorneys.

UNITED STATES PATENT OFFICE.

ROBERT W. GARDNER, OF QUINCY, ILLINOIS.

IMPROVEMENT IN GOVERNORS FOR STEAM-ENGINES.

Specification forming part of Letters Patent No. 142,846, dated September 16, 1873; application filed March 8, 1873.

*To all whom it may concern:*

Be it known that I, ROBERT W. GARDNER, of Quincy, in the county of Adams and State of Illinois, have invented a new and Improved Governor, of which the following is a specification:

The invention consists in the improvement of steam-engine governors, as hereinafter described and pointed out in the claim.

Figure 1 is a side elevation of a governor or steam-engines constructed according to my invention. Fig. 2 is a sectional elevation taken on the line $x\ x$ of Fig. 1, and Fig. 3 is a horizontal section taken on the line $y\ y$, Fig. 1.

A is the stem of the valve, which is lifted to open it by the weighted lever B, when the balls C fall and allow the short arm D of the lever, which is pivoted at E, to rise, and it is closed, when working regularly, by the rising of the balls, which force the valve-stem and the lever down. The support F of the fulcrum E is a tube, closed at the top and fitted on the rod G, so as to fall when the governor-belt breaks, and allow the fulcrum of the lever D to fall and close the valve on its working seat by forcing the stem down, the end J being prevented from swinging up by the stop L. To cause the fulcrum to fall when the belt fails it is held up by the arm M, which is kept in the groove N of the fulcrum-support by the strain of the belt, with sufficient pressure to hold it up; but when the pressure ceases by the failure of the belt the weight on the fulcrum-support throws the arm out, and the fulcrum falls. My present invention consists of the connection of this arm M to a vertical rod or shaft, O, mounted on pivots P at the ends, so as to have horizontal oscillation, and carrying the shaft Q, which drives the governor, in a bearing, R, so that the strain of the governor-belt, which works on a pulley at the outer end of this shaft, will keep the arm M in the groove N to hold the fulcrum up, whereby I only have the shaft O to turn for turning the arm M, instead of the frame of the governor, as heretofore. The pivots of this shaft O are mounted in stationary arms S projecting from the frame T, which I make stationary, and therefore have it steadier and firmer than when it is made to turn for turning said arm.

Having thus described my invention, I claim as new and desire to secure by Letters Patent—

The combination, with tube F having groove N, and movable on rod G, of the arm M, oscillating rod O, and governor drive-shaft Q, as and for the purpose described.

ROBERT W. GARDNER.

Witnesses:
   D. H. WIGHTMER,
   W. L. WILLIS.